Nov. 23, 1937.  N. P. STOATE ET AL  2,100,227
APPARATUS FOR DETECTING THE PRESENCE OF FOREIGN
BODIES ON THE BOTTOMS OF TRANSPARENT VESSELS
Filed Jan. 28, 1936  5 Sheets-Sheet 1

INVENTORS
Norman P. Stoate
William Albert Robinson
BY
ATTORNEY

Nov. 23, 1937.  N. P. STOATE ET AL  2,100,227
APPARATUS FOR DETECTING THE PRESENCE OF FOREIGN
BODIES ON THE BOTTOMS OF TRANSPARENT VESSELS
Filed Jan. 28, 1936   5 Sheets-Sheet 3
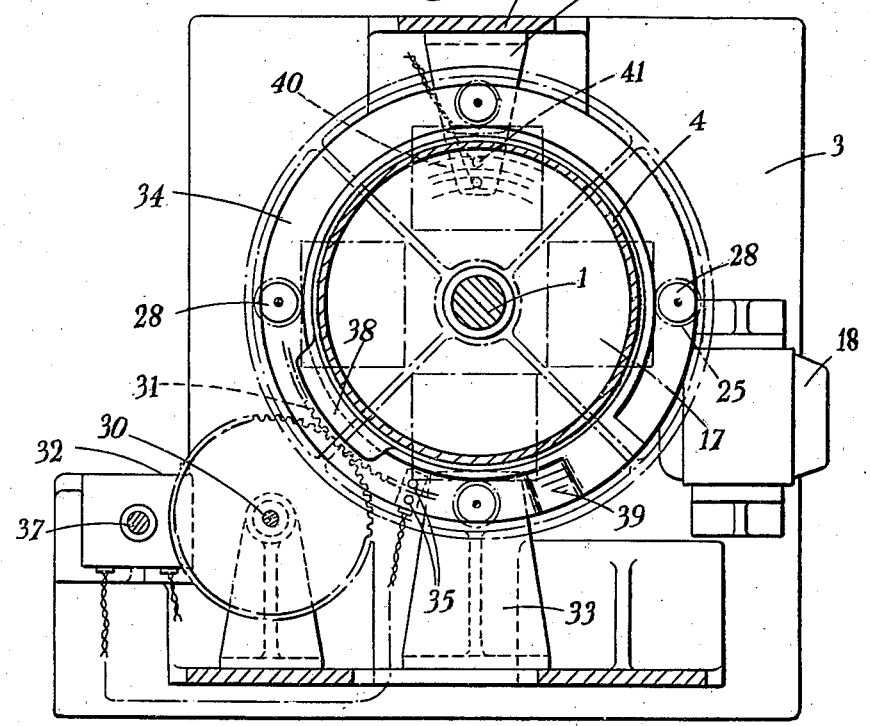
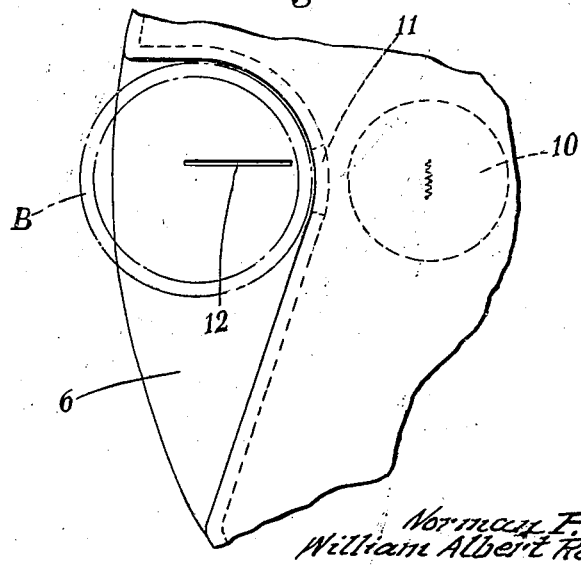

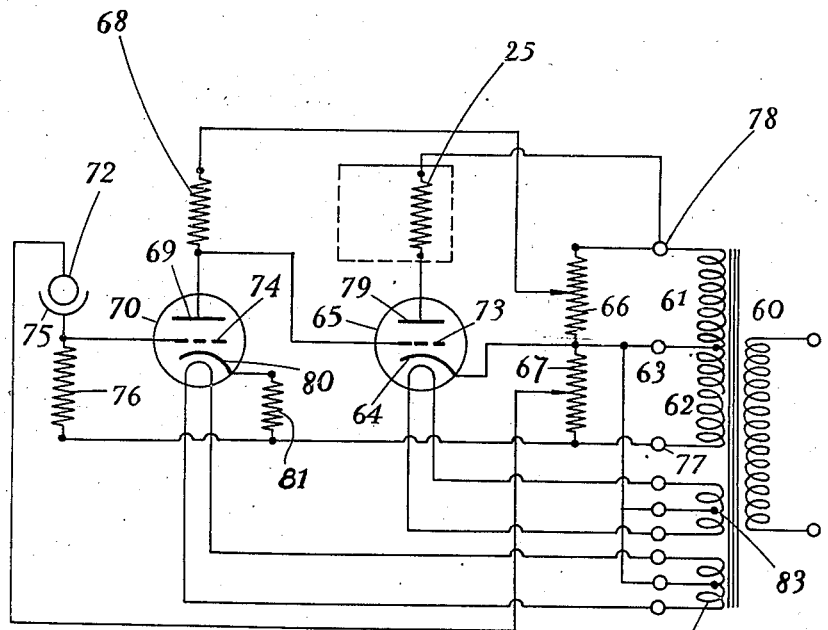
Fig. 7.
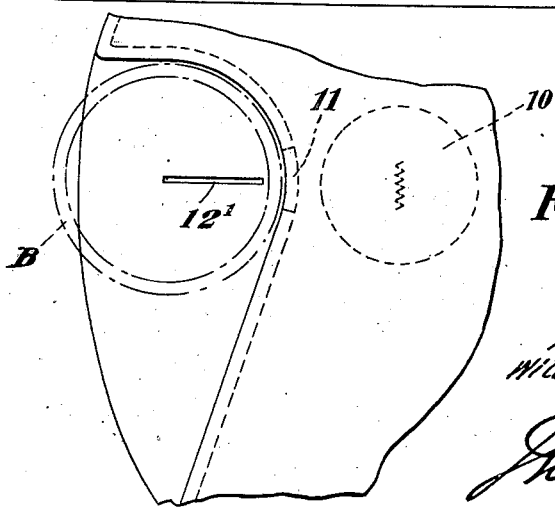
Fig. 4.ᵃ

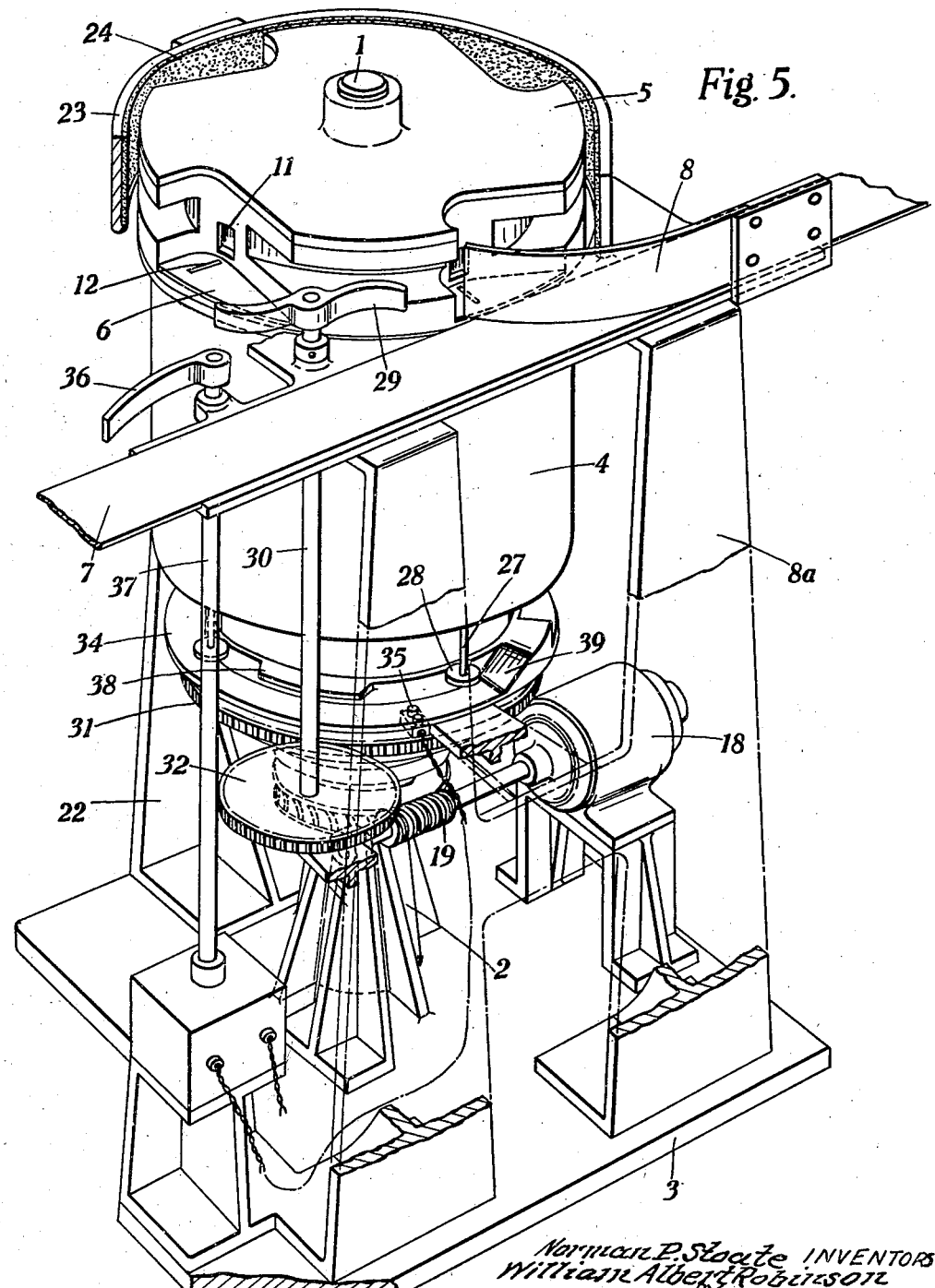

Patented Nov. 23, 1937

2,100,227

UNITED STATES PATENT OFFICE 2,100,227

APPARATUS FOR DETECTING THE PRESENCE OF FOREIGN BODIES ON THE BOTTOMS OF TRANSPARENT VESSELS

Norman Parker Stoate, Kew Gardens, and William Albert Robinson, Wembley Hill, England; said Robinson assignor to said Stoate Application January 28, 1936, Serial No. 61,254

9 Claims. (Cl. 209—111)

This invention relates to apparatus for detecting the presence of foreign bodies on the bottoms of transparent vessels.

According to the present invention the apparatus comprises a support (to receive the vessel) having a narrow scanning slit formed therein, a light-sensitive device disposed beneath the scanning slit, a source of light disposed to direct its light through the bottom of the vessel on to the slit, means for rotating the vessel about its longitudinal axis and means operable under the control of the light-sensitive device to give a signal or indication when the light falling on the light-sensitive device is reduced below a predetermined value.

Preferably, the support and the light-sensitive device are mounted on a rotatable element and the rotation of the vessel is produced by engagement of the external wall of the vessel with a fixed rail, as the element rotates and moves the support and the vessel bodily along a circular path.

In order to explain the invention further one construction according thereto, which is particularly intended for the inspection of milk bottles, will now be described by way of example with reference to the accompanying drawings, although the invention is not limited to this particular example.

In the drawings:—

Figure 3 is a cross sectional plan on the line III—III of Figure 2;

Figure 4 is a view on a larger scale showing one arrangement of the scanning slit;

Figure 4ª is a similar view showing an alternative arrangement of the scanning slit;

Figure 5 is a perspective view of the apparatus; and

Figure 6:
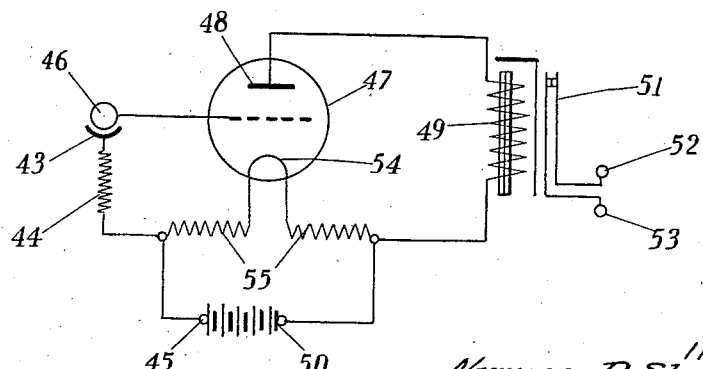

Figures 6 and 7 show alternative wiring diagrams for one of the photocell circuits.

In the construction illustrated in the drawings the apparatus comprises a vertical central shaft 1 fixed in a support 2 carried by a base plate 3.

Rotatably mounted on the shaft 1 is a casing 4 on the upper part of which is carried a head 5 comprising four platforms 6 to receive the bottles.

The bottles are fed to the rotating head 5 by a conveyor band 7, which may be driven by any known means, a guide 8 being provided to feed the bottles on to the platforms 6; the head 5 being recessed at the platform as shown in order to locate a bottle on the platforms.

Formed in the head 5 behind each of the platforms 6 is a chamber 9 containing a lamp 10, there being provided in the outer wall of said chamber a window 11 through which light from said lamp may pass.

Formed in each platform 6 is a narrow scanning slit 12 disposed on the same side of the centre of the bottle (shown at B) when in position, as the lamp 10, so that light from the lamp 10 passes through the window 11, the bottle B, and the slit 12 on to a reflector 13 and thence on to a photo-electric cell 14, the reflector and photo-electric cell being mounted in a chamber 15 formed in the casing below the platform 6.

Figure 2:
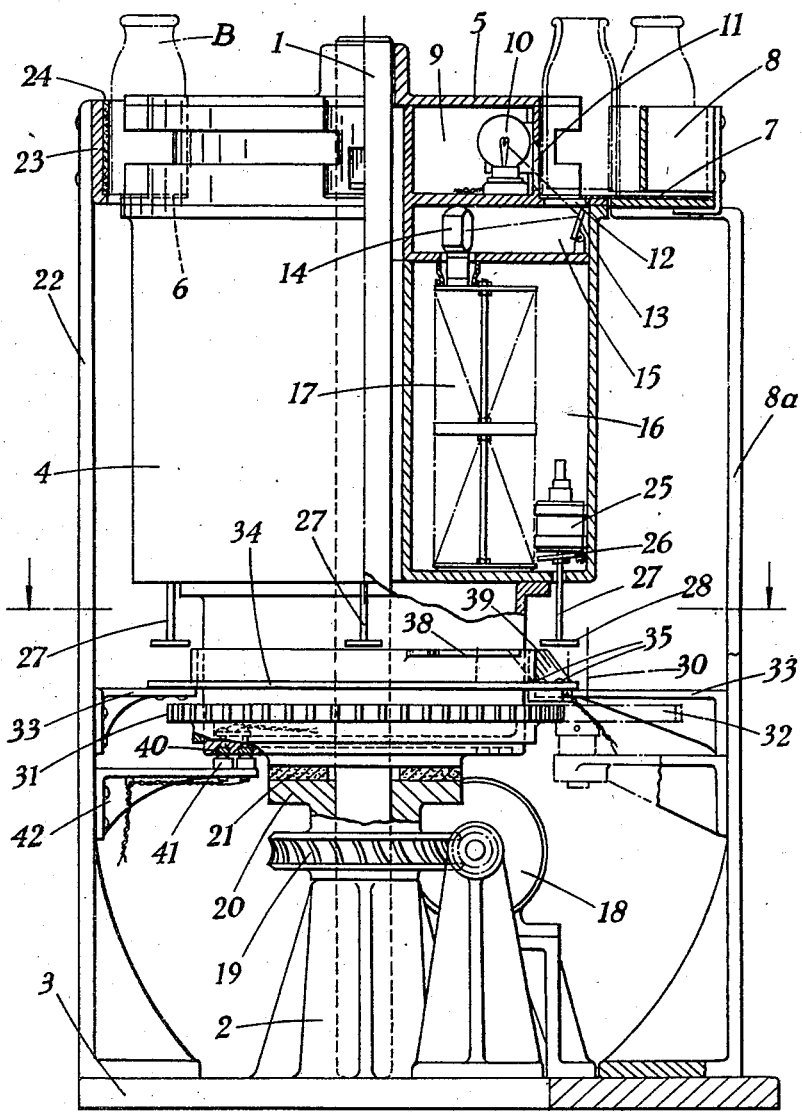
Figure 2 is a cross sectional elevation on the line II—II of Figure 1, parts being broken away.

There is a chamber 15 containing a reflector 13 and photo-cell 14 below each platform 6, and below the chambers 15 the casing 4 is divided into four compartments 16 which serve to house the amplifiers for the photo-cells, one of said amplifiers being shown diagrammatically at 17 in Figure 2.

The casing 4 is rotated by an electric motor 18 which through a worm gear 19 drives a clutch element 20 freely mounted on the shaft 1. The casing 4 rests freely on a friction disc 21 disposed between the bottom 4a of the casing 4 and the clutch element 20, the weight of the casing being sufficient to provide an effective friction grip and consequent driving of the casing from the motor.

The advantage of this arrangement is that the casing can be withdrawn vertically and replaced by another casing adapted for different sized bottles, without necessitating the dismantling of the driving mechanism.

Carried on a standard 22 is a rail 23 of circular form the inside surface of which is provided with a lining 24 of a resilient material, e. g. rubber. The internal diameter of this rail 23 is such that as the casing 4 rotates and carries the bottles B round, the external wall of each bottle engages the lining 24 of the rail 23 whereby the bottles are rotated about their longitudinal axes on the platforms 6 as they travel round bodily with the head 5.

The length and disposition of the slit 12 must be such that the smallest particle which the apparatus is intended to detect, will, whether located right against the inside wall of the bottle, or at the centre or between these points, reduce the quantity of light reaching the slit 12 to an extent sufficient to affect the photo-cell 14.

Figure 1:
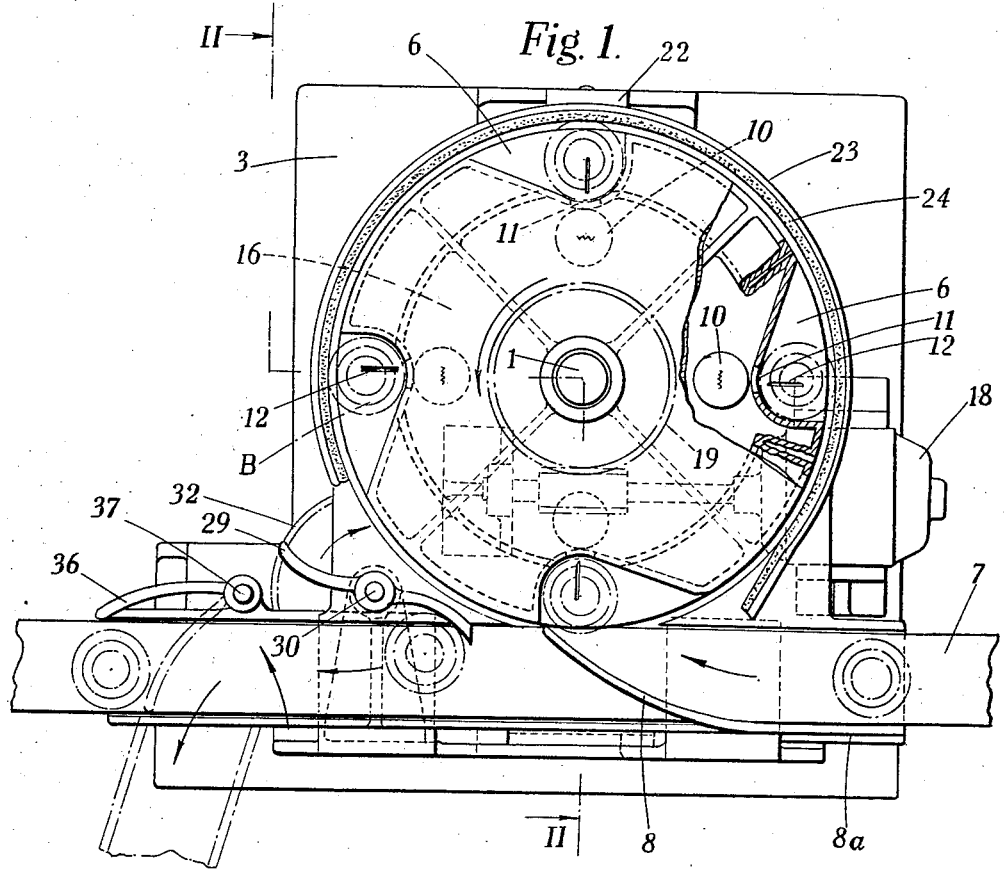
Figure 1 is a plan of the apparatus.

As shown in Figure 1 and in Figure 4 the slit 12 is disposed to one side of a radius of the bottle when the latter is in position on the platform 6. With this arrangement the sensitivity of the apparatus is increased and a wider slit can be used compared with that which would be necessary if the centre line of the slit were coincident with a radius of the bottle, owing to the obliquity of the light which falls on the slit when the latter is disposed to one side of a radius. The slit however must not be located so far from a radius that the smallest particle to be detected, if located at the centre, will not affect the light falling on the slit.

The slit 12 and the lamp 10 must be located on the same side of the centre of the bottle, but the slit need not extend completely to the inside wall of the bottle, since the shadow thrown by the particle will be directed inwardly towards the centre and will fall on the slit even though the latter is not actually covered by the particle, although the extent to which the end of the slit falls short of the inside wall of the bottle depends on the size of the particle and the angle of the light falling thereon.

If it is desired to detect small particles of transparent material then the slit should extend beyond the centre of the bottle.

The reason for this is that if a small transparent particle is located at the centre and the slit only extends up to the centre then the particle, although covering the slit, will allow light to pass through and fall on the slit. On the other hand if the slit extends beyond the centre the shadow (caused by refraction) thrown by the particle, which will be beyond the centre, will fall on to the slit.

If desired the slit may be disposed so as to coincide with a radius of the bottle when the latter is in position. Such an arrangement of the slit is shown at 12' in Figure 4ª.

Mounted in each of the compartments 16 is a magnet 25 the current to which is controlled by the photo-cell 14 through the amplifier 17.

This magnet has a hinged armature 26 through which passes a trip rod 27 carrying at its lower end an insulated contact bridge in the form of a disc 28.

The hole in the armature 26 through which the rod 27 passes is slightly larger than the diameter of the rod, so that when the magnet 25 is in the de-energized condition the armature drops until the edge of the hole rests against the side of the rod 27. The friction between the rod 27 and the edge of the hole in the armature retains the rod 27 in its upper position until the magnet is energized whereupon the armature is attracted into the horizontal position, thereby relieving the rod of the lateral pressure due to the weight of the armature so that the rod is free to fall and connect a pair of contacts by means of its bridge 28.

This form of contact making mechanism is well known and forms no part of the present invention.

As already mentioned the head 5 rotates about the shaft 1 and during this rotation the bottles B, rotate about their axes whereby the bottom of each bottle is scanned by passing over the slit 12.

If during this scanning operation a foreign body is present in a bottle, this body on passing across the scanning slit, will reduce the light falling on the photo-cell 14 and the current flowing through the amplifier will be increased.

This increased current closes the contacts of a relay, as will be explained later with reference to the wiring diagram of Figure 6, whereby current is supplied to the magnet 25 and the trip rod 27 is allowed to fall as already explained.

This fall of the trip rod 27 is utilized to eject the defective bottle and the means for effecting this operation will now be described.

The bottles are discharged from the head 5 on to the conveyor band 7 by means of rotating fingers 29 which act alternately, being secured to a shaft 30 which is driven at a speed relative to that of the casing 4 such that the bottle when impelled by one of the fingers 29 travels faster than when impelled by the head 5. This shaft 30 is rotated by means of gear teeth 31 cut on the lower part of the casing, which teeth engage with a gear wheel 32 secured to the shaft 30.

Mounted on brackets 33 secured to the standards 8a and 22 is a fixed ring 34 carrying a pair of insulated contacts 35 connected to apparatus for releasing a guide 36 for ejecting the defective bottle from the band 7 after said bottle has been discharged from the head 5 onto said band.

This guide 36 is secured to a shaft 37 and is normally latched in the full line position of Figure 1, a magnet for releasing the latch being energized when the contacts 35 are bridged. When the latch is released a spring pulls the guide 36 into the chain line position so that the defective bottle is guided off the band 7 onto a receiving platform.

It will be understood that a bottle in which no foreign body has been detected will, in passing off the platform 6, tend to release the trip rod 27, since the walls of the bottle in passing over the slit 12 will reduce the light reaching the photo-cell.

In order to obviate this incorrect release of the trip rod 27, a guard plate 38 is provided above the ring 34 this plate 38 being disposed so that its upper surface is just level with the under-surface of the disc 28 on the rod 27 when the latter is in its raised position. When the magnet 25 is energized due to the bottle walls passing over the slit 12, the rod 27 is prevented from dropping by the guard plate 38.

If, however, the magnet 25 has already been energized due to a foreign body in the bottle passing over the slit 12, the rod 27 will have dropped until arrested by its disc 28 engaging the ring 34. The disc 28 will therefore pass round under the guard plate 38 and will bridge the contacts 35, thereby releasing the ejector finger or guide 36.

The contacts 35 must be placed so as to give the necessary delay in the release of the guide 36, which release must occur after the preceding bottle has passed the position which the guide 36 occupies when released, but before the bottle to be rejected has reached a position in which it would be struck by the guide 36 during movement of the latter.

In order to reset the trip rod into its upper position after it has been released, a ramp 39 is provided on the ring 34. Conveniently this ramp is placed so as to be engaged by the disc 28 just after a bottle has arrived on the associated platform 6. By this means the trip is reset after having been released either by a foreign body in the bottle which was previously on the platform, or by the passage of the walls of the next following bottle over the slit while said following bottle was passing on to the platform.

Current is supplied to the electrical circuits of the apparatus through brushes 41 secured to a fixed bracket 42 and engaging with slip rings 40 secured to the underside of the lower portion of the casing 4. Any form of amplifier may be employed provided that it is suitable for the characteristics of the particular type of photo-cell used. A common form of amplifier circuit for use with battery supply is illustrated diagrammatically in Figure 6.

In this circuit the cathode 43 of the photo-cell is connected through a resistance 44 to one pole 45 of the battery, while the anode 46 is connected to the grid of an amplifying valve 47. The anode 48 of the valve 47 is connected to one end of the winding 49 of a relay, and the other end of said winding is connected to the other pole 50 of the battery.

The contacts 51 of the relay are in the circuit of the magnet 25 for controlling the trip rod 27, said magnet having one terminal connected to the relay terminal 52 while the other terminal of the magnet is connected to one pole of a source of current, the other pole of said source being connected to the terminal 53 of the relay.

The filament 54 of the valve 47 is connected in the usual manner across the mains 45, 50 through resistances 55.

If desired, instead of or in addition to energizing the magnet 25 to eject a defective bottle, the relay 50 may close the circuit of a visible or audible signal or may open a switch supplying current to the driving motor 18. Such arrangements are, however, well known and need not be described in this specification.

For use with alternating current from the mains the following circuit is preferred.

In this circuit a mains transformer 60 is provided which has a centre tapped secondary winding 61, 62, the induced voltages in the two halves of this winding being in phase opposition. The centre point 63 of the secondary winding is connected to the cathode 64 of a gas filled relay 65 and across each half winding is a potentiometer 66, 67 respectively.

One of these potentiometers 66 is connected through a resistance 68 to the anode 69 of an amplifying valve 70, while the other potentiometer 67 is connected to the anode 72 of the photo-electric cell.

The anode 69 of valve 70 is directly connected to the grid 73 of the gas filled relay 65 and the grid 74 of the valve 70 is connected to the cathode 75 of the photocell. The cell cathode 75 is also connected through a limiting resistance 76 to the outer terminal 77 of the portion 62 of the secondary winding of transformer 60. Further the cathode 80 of the valve 70 is also connected to the terminal 77 through a resistance 81.

The outer terminal 78 of the other portion 61 of said secondary is connected through the winding of magnet 25 to the anode 79 of the gas filled relay 65.

Windings 82 and 83 are provided for heating the filaments of the valve 70 and relay 65.

With the two potentiometers correctly set and with a given light value on the cell, the circuit is passive and no current flows through the magnet winding 25. If, however, the light falling on the photocell is reduced below a predetermined value, then the equilibrium of the circuit is disturbed and the magnet 25 becomes energized.

Although in the foregoing description the rail 23 has been referred to as extending completely along the path of the bottles while on the platforms 6, such an arrangement is not essential. It is sufficient if the rail is made of a length at least equal to the circumference of the bottle so that the bottle is caused to make at least one revolution during its contact with the rail.

What we claim is:—

1. Apparatus for detecting the presence of foreign bodies on the bottoms of transparent vessels comprising in combination a support for a vessel, said support having a narrow scanning slit formed therein having an area small relatively to that of the bottom of the vessel and a length substantially equal to the radius of the vessel, a light-sensitive device disposed beneath the support, a source of light disposed to direct its light through the bottom of the vessel onto the slit, means for rotating the vessel about its longitudinal axis whereby the entire surface is scanned, means operable under the control of the light-sensitive device to give a signal or indication when the light falling on the light-sensitive device is reduced below a predetermined value, and means for preventing operation of the indicating means due to the passage of the walls of the vessel across the scanning slit.

2. Apparatus for detecting the presence of foreign bodies on the bottoms of transparent vessels, comprising in combination a rotatable assembly including a support for a vessel, having a narrow scanning slit formed therein, a light-sensitive device disposed beneath the support, and a source of light disposed to direct its light through the bottom of the vessel onto the slit, means for rotating said assembly, a fixed rail of a length at least equal to the circumference of a vessel and disposed to engage the wall of the vessel as said assembly rotates whereby the vessel is caused to make at least one complete rotation about its longitudinal axis and means operable under the control of the light-sensitive device to give a signal or indication when the light falling on the light-sensitive device is reduced below a predetermined value.

3. Apparatus for detecting the presence of foreign bodies on the bottoms of transparent vessels, comprising in combination a rotatable assembly including a support for a vessel, having a narrow scanning slit formed therein, said slit being coincident with a radius of the vessel when said vessel is in position on the support, and extending beyond the centre of the vessel, a light-sensitive device disposed beneath the support and a source of light disposed to direct its light through the bottom of the vessel on to the slit, means for rotating the vessel about its longitudinal axis, means operable under the control of the light-sensitive device to give a signal or indication when the light falling on the light-sensitive device is reduced below a predetermined value, and means for preventing operation of the indicating means due to the passage of the walls of the vessel across the scanning slit.

4. Apparatus according to claim 2 for detecting the presence of foreign bodies on the bottoms of transparent vessels, wherein the scanning slit is coincident with a radius of the vessel when on the support and extends beyond the centre of said vessel.

5. Apparatus according to claim 1 for detecting the presence of foreign bodies on the bottoms of transparent vessels, wherein the scanning slit is disposed parallel with but displaced to one side of a radius of a vessel, when on the support, whereby a wider slit can be employed than when the slit is disposed radially owing to the obliquity of the light rays falling on said slit.

6. Apparatus according to claim 2 for detecting the presence of foreign bodies on the bottoms of transparent vessels, wherein the scanning slit is disposed parallel with but displaced to one side of a radius of a vessel, when on the support, whereby a wider slit can be employed than when the slit is disposed radially owing to the obliquity of the light rays falling on said slit.

7. Apparatus according to claim 2 for detecting the presence of foreign bodies on the bottoms of transparent vessels including means for preventing operation of the indicating means due to the passage of the walls of a vessel across the scanning slit.

8. Apparatus for detecting the presence of foreign bodies on the bottoms of transparent vessels, comprising in combination a rotatable assembly including a support for a vessel, said support having a narrow scanning slit formed therein, a light-sensitive device disposed beneath the support and a source of light disposed to direct its light through the bottom of the vessel onto the slit, means for rotating said assembly and for rotating the vessel about its longitudinal axis while on the support, conveying means for removing a vessel from the support operating in timed relation to the rotatable assembly, normally inoperative mechanism for ejecting a vessel which contains a foreign body from said conveying means, means operable under the control of the light-sensitive device for rendering said ejecting mechanism operative, timing means for delaying the operation of said ejecting mechanism until the defective vessel has reached a predetermined location, and means for preventing operation of the indicating means due to the passage of the walls of the vessel across the scanning slit.

9. Apparatus according to claim 8 for detecting the presence of foreign bodies on the bottoms of transparent vessels, wherein the means operable under the control of the light-sensitive device includes a movable contact normally in an upper position but adapted to fall to a lower position when the light falling on the light-sensitive device is reduced below a predetermined value, a fixed track on which said movable contact rests after it has fallen, a fixed contact disposed in said track at a point such that it will be engaged by said movable contact when the vessel which caused the fall of said movable contact reaches a predetermined point on the conveying means, a fixed guard plate disposed at the same level as the movable contact when in its upper position, said guard plate extending over that portion of the path of the movable contact which is traversed by said movable contact while the walls of a vessel are passing over the scanning slit during discharge of said vessel, whereby said movable contact is prevented from falling due to the reduction of the light reaching the light-sensitive device produced by the vessel walls, and a ramp on said fixed track for resetting the movable contact, said ramp being located so as to be reached by the movable contact after said contact has passed the station at which the vessels arrive on the support.

NORMAN PARKER STOATE.
WILLIAM ALBERT ROBINSON.